(12) United States Patent
Hooper

(10) Patent No.: US 7,389,832 B2
(45) Date of Patent: Jun. 24, 2008

(54) HYDROSTATIC MECHANICAL SEAL WITH LOCAL PRESSURIZATION OF SEAL INTERFACE

(75) Inventor: Michael E. Hooper, Spring, TX (US)

(73) Assignee: Dyna-Drill Technologies, Inc., Houston, TX (US)

( * ) Notice: Subject to any disclaimer, the term of this patent is extended or adjusted under 35 U.S.C. 154(b) by 76 days.

(21) Appl. No.: 11/441,582

(22) Filed: May 26, 2006

(65) Prior Publication Data

US 2008/0047756 A1    Feb. 28, 2008

(51) Int. Cl.
*F16J 15/34* (2006.01)
(52) U.S. Cl. .......................... 175/107; 277/306
(58) Field of Classification Search ................ 175/107; 166/242.1, 242.6; 277/306, 367, 369, 401
See application file for complete search history.

(56) References Cited

U.S. PATENT DOCUMENTS

| | | | |
|---|---|---|---|
| 3,365,202 A | | 1/1968 | Carleton |
| 4,014,555 A | | 3/1977 | Jacottet |
| 4,123,069 A | | 10/1978 | Sato |
| 4,281,724 A | | 8/1981 | Garrett |
| 4,451,049 A | | 5/1984 | Charhut |
| 4,593,774 A | | 6/1986 | Lingafelter |
| 4,838,559 A | | 6/1989 | Guardiani et al. |
| 5,201,531 A | * | 4/1993 | Lai .............................. 277/400 |
| 5,217,233 A | * | 6/1993 | Pecht et al. ................. 277/306 |
| 5,375,853 A | * | 12/1994 | Wasser et al. ................ 277/366 |
| 5,385,409 A | * | 1/1995 | Ide .............................. 277/400 |
| 5,409,240 A | | 4/1995 | Ballard |
| 5,468,002 A | * | 11/1995 | Wasser ........................ 277/361 |
| 5,472,058 A | | 12/1995 | Hooper et al. |
| 5,529,315 A | * | 6/1996 | Borrino et al. ............... 277/352 |
| 5,713,576 A | * | 2/1998 | Wasser et al. ................ 277/304 |
| 5,947,479 A | * | 9/1999 | Ostrowski ................... 277/306 |
| 6,026,917 A | | 2/2000 | Zahradnik et al. |
| 6,427,790 B1 | | 8/2002 | Burr |
| 6,446,976 B1 | * | 9/2002 | Key et al. .................... 277/367 |
| 2003/0098547 A1 | | 5/2003 | Yamada et al. |
| 2006/0244221 A1 | * | 11/2006 | Villeneuve et al. .......... 277/410 |

FOREIGN PATENT DOCUMENTS

| | | |
|---|---|---|
| GB | 1282915 | 7/1972 |
| GB | 2329432 A | 3/1999 |
| WO | WO-97/13084 | 4/1997 |

OTHER PUBLICATIONS

4610 Compact Cartridge Seal product literature, copyright Nov. 2000 by John Crane.
UltraMAX High Performance Bits for Motor and High Speed Applications Product Literature, copyright 1998 by Hughes Christensen Company.
Theory and Practice of Lubrication for Engineers, by Dudley D. Fuller, published 1984 by John Wiley & Sons, New York, New York, pp. 405-419.

* cited by examiner

*Primary Examiner*—William P Neuder

(57) ABSTRACT

A hydrostatic mechanical seal assembly includes a locally deployed pump for pressurizing a lubricant fluid between the opposing faces of a mating ring and a sealing ring. In one exemplary embodiment, such pressurization may be achieved via a device that converts the rotational motion of a drive shaft into fluid pressure. The locally deployed pump is intended to advantageously provide a stable positive pressure on the sealing interface between the mating and sealing rings, which may provide improved sealing characteristics, especially in demanding downhole environments.

34 Claims, 3 Drawing Sheets

US 7,389,832 B2

HYDROSTATIC MECHANICAL SEAL WITH LOCAL PRESSURIZATION OF SEAL INTERFACE

FIELD OF THE INVENTION

The present invention relates generally to hydrostatic mechanical face seals for providing, for example, fluid sealing between a housing and a rotating shaft. This invention more specifically relates to a hydrostatic mechanical seal assembly having a local arrangement for pressurizing fluid near the sealing interface. Although not limited to any particular deployment, this invention may be particularly advantageous in various downhole drilling tools such as drilling motors, drill bit assemblies, and rotary steering tools.

BACKGROUND OF THE INVENTION

Mechanical face seals are used on various types of machines and equipment, such as pumps, compressors, and gearboxes, for providing a seal between, for example, a rotating shaft and a stationary component such as a housing. Such mechanical seals typically include a pair of annular sealing rings concentrically disposed about the shaft and axially spaced from each other. Typically, one sealing ring remains stationary (e.g., engaged with the housing) while the other sealing ring rotates with the shaft. The sealing rings further include opposing sealing faces that are typically biased towards one another. Mechanical seals may be generally categorized as "contacting" or "non-contacting". In contacting mechanical seals the biasing force is carried by mechanical contact between the annular sealing rings. In non-contacting mechanical seals a pressurized fluid film between the annular sealing rings carries the biasing force. Non-contacting mechanical seals may be subcategorized as "hydrodynamic pressure lubricated" or "hydrostatic pressure lubricated".

In a hydrodynamic pressure lubricated mechanical face seal (also referred to herein as a hydrodynamic mechanical seal) the seal faces are provided with features such as grooves or vanes. Relative motion of the faces thus tends to draw the lubricating fluid into the interface between the seal faces and effectively pressurize the lubricating fluid film against the fluid being sealed (e.g., drilling fluid in downhole tools). The hydrodynamic lift (separation) of the faces is dependent on rotational speed, fluid viscosity, and the shape of the hydrodynamic features. Fluid viscosity is typically highly dependent on temperature. Such dependencies on speed and temperature tend to make it difficult to design hydrodynamic seals that meet the criteria required for typical downhole tools.

In hydrostatic pressure lubricated mechanical face seals (also referred to herein as hydrostatic mechanical seals) an essentially steady state fluid pressure is provided to the interface between the seal faces, for example, by remote pumps or energized accumulators. In a typical hydrostatic pressure lubricated seal, a radial taper is formed in the seal interface. The radial taper typically converges from the higher pressure fluid to the lower pressure fluid and acts to maintain a predetermined gap between the seal faces (the size of the gap being the primary deterrent to fluid leakage). Hydrostatic mechanical seals typically have a broader range of stable operation as compared with hydrodynamic mechanical seals. For example, hydrostatic mechanical seals are typically much less dependent on rotational speed than hydrodynamic mechanical seals.

In use hydrostatic mechanical seals typically require a stable pressure differential from the higher pressure sealed fluid to the lower pressure excluded fluid. Reversing pressure may be particularly harmful since it may reverse the direction of fluid flow. Such pressure changes may also change the radial taper such that it reverses convergence, thereby allowing contaminants into the sealing interface and compromising the sealing function. Accumulators, in particular, tend to be subject to sticking or fouling, which may cause loss (or reversing of) pressurization in hydrostatic mechanical seals. Such loss (or reversing) of pressurization often allows the excluded fluid to enter the seal interface and thus may result in premature failure of the seal assembly. In certain downhole tools, such as drill bit assemblies, drilling motors, rotational steering tools, measurement while drilling tools, turbines, alternators, and production pumps, such failure of the seal assembly often results in penetration of drilling fluid into the interior of the tool, which is known to have caused serious damage and/or failure of the tool.

Furthermore, remote pressurizing devices tend to be slow to respond to external pressure variations, for example, drilling fluid pressure spikes in a downhole drilling environment. Such pressure spikes have been observed to cause a pressure reversal in hydrostatic mechanical seals and therefore may also allow excluded fluid, such as drilling fluid, to penetrate into the interior of the tool.

Therefore, there exists a need for an improved hydrostatic mechanical seal assembly, in particular, an improved hydrostatic mechanical seal assembly including a pressure generating device that might provide improved robustness for use in downhole tools.

SUMMARY OF THE INVENTION

The present invention addresses one or more of the above-described drawbacks of prior art hydrostatic mechanical sealing assemblies. Aspects of this invention include a hydrostatic mechanical seal assembly comprising a locally deployed pump for pressurizing a lubricant fluid between the opposing faces of a mating ring and a sealing ring. In one embodiment, such pressurization may be achieved via a device that converts the rotational motion of a drive shaft into fluid pressure. For example, a helical groove pump may be deployed integral with a sealing ring carrier. Alternatively, a cam driven piston pump may be deployed, for example, about a rotating shaft in close proximity with the mating and sealing rings. Other alternative embodiments of hydrostatic mechanical sealing assemblies according to this invention may include, for example, piston, vane, gear, positive displacement, electro-mechanical, and/or centrifugal pumps, and the like deployed locally with the seal assembly.

Exemplary embodiments of the present invention advantageously provide several technical advantages. In particular, embodiments of this invention may provide a stable positive pressure on the sealing interface between the mating and sealing rings. As a result, various embodiments of the hydrostatic mechanical sealing system of this invention may exhibit improved sealing characteristics, especially in demanding downhole environments. Tools embodying this invention may thus display improved reliability and prolonged service life as compared to tools utilizing conventional hydrostatic mechanical sealing assemblies. The local pressurization provided by this invention also obviates the need for remote pumps and/or energized accumulators typically used in conjunction with conventional hydrostatic mechanical seals.

In one aspect this invention includes a hydrostatic mechanical face seal assembly. The assembly includes a mating ring having a first sealing face and a sealing ring having a second sealing face, the first and second sealing faces being biased towards one another. The sealing ring is deployed substantially coaxially with the mating ring and further disposed to rotate relative to the mating ring. The assembly further includes a pump disposed to pressurize a lubricating fluid at an interface between the first and second sealing faces. The pump is deployed locally with the mating ring and the sealing ring. In one exemplary embodiment of this invention the mating ring is coupled to a mating ring carrier, the sealing ring is coupled to a sealing ring carrier, and the pump is deployed on a member selected from the group consisting of the sealing ring, the sealing ring carrier, the mating ring, and the mating ring carrier.

In another aspect, this invention includes a tool having a rotatable drive shaft deployed in a substantially non rotating tool housing and a hydrostatic mechanical face seal assembly disposed to seal a contaminant fluid. The seal assembly includes a mating ring having a first sealing face, the mating ring deployed substantially coaxially about the drive shaft; the mating ring being substantially non rotational relative to the tool housing. The seal assembly also includes a sealing ring having a second sealing face, the sealing ring deployed substantially coaxially about and coupled with the drive shaft, the sealing ring and the mating ring disposed to rotate relative to one another, the first face and the second face biased towards one another. The seal assembly further includes a pump disposed to pressurize a lubricating fluid at an interface between the first and second sealing faces, the pump deployed locally with the seal assembly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
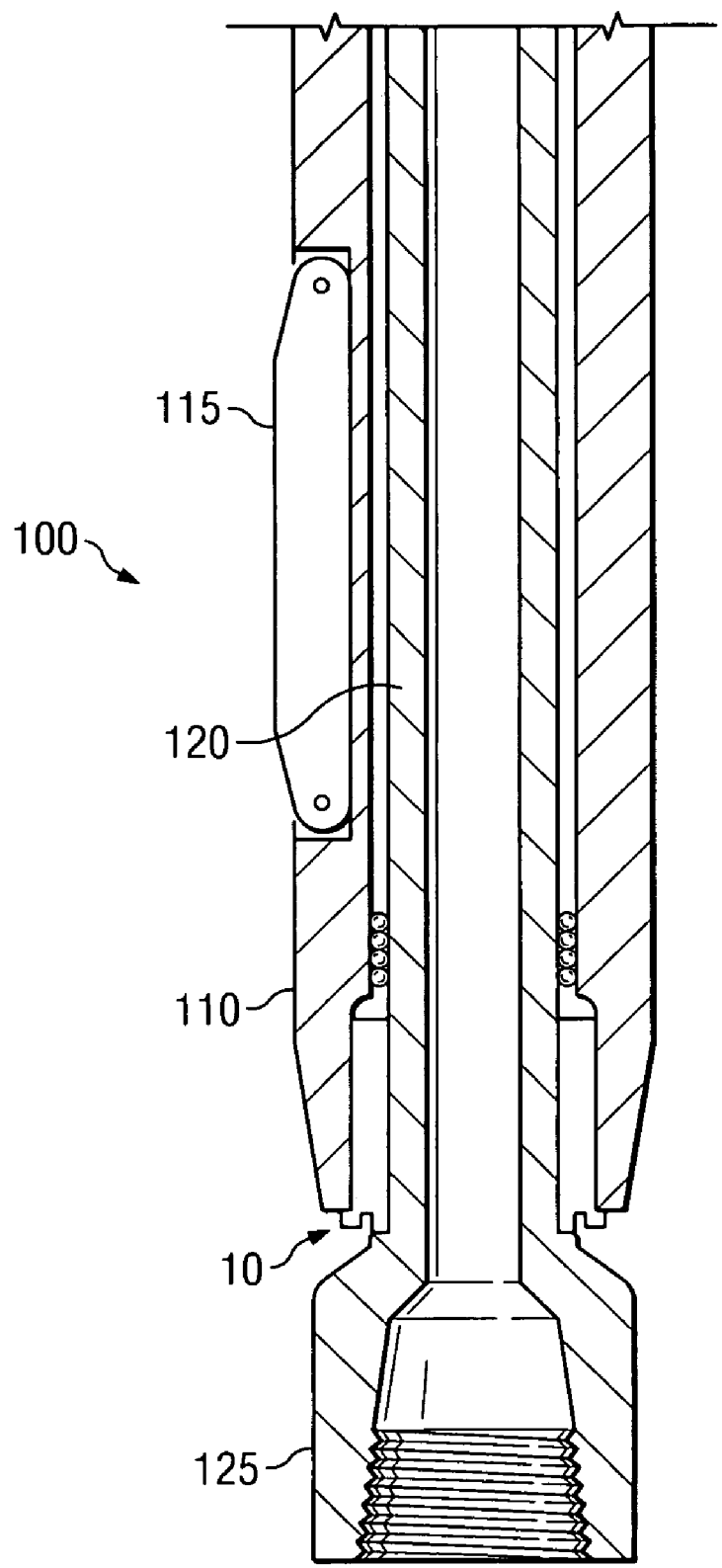
FIG. 1 depicts a downhole tool including an exemplary hydrostatic mechanical seal assembly embodiment according to the present invention.
Figure 2:
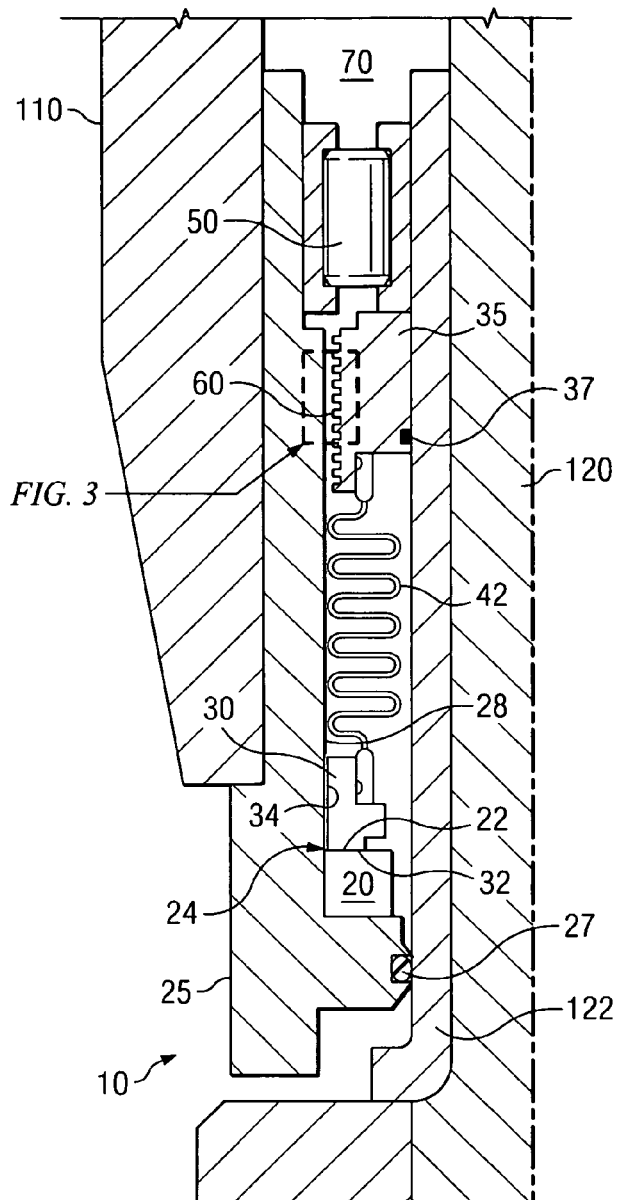
FIG. 2 depicts, in cross section, an exemplary hydrostatic mechanical seal assembly according to this invention.
Figure 3:
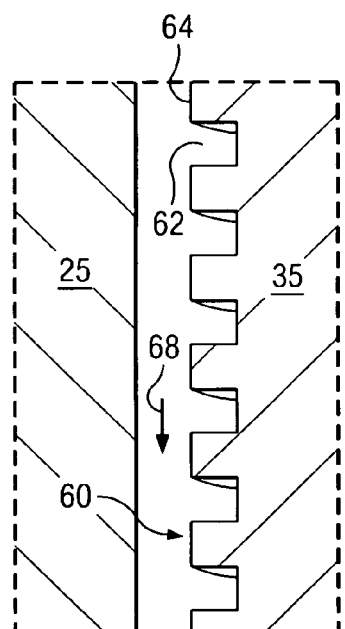
FIG. 3 depicts, in cross section, a portion of the embodiment shown on FIG. 2.

Referring to FIGS. 1 through 3, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 3 may be described herein with respect to that reference numeral shown on other views.

FIG. 1 schematically illustrates one exemplary embodiment of a hydrostatic mechanical seal assembly 10 according to this invention in use in a downhole tool, generally denoted 100. Downhole tool 100 may include substantially any tool used downhole in the drilling, testing, and/or completion of oilfield wells, although the invention is expressly not limited in this regard. For example, as shown in FIG. 1, downhole tool 100 may include a three-dimensional rotary steering tool (3DRS) in which the seal assembly 10 provides a sealing function between an inner rotating shaft (or cylinder) 120 and an outer housing 110. In such a configuration, the housing 110 and force application members 115 are typically substantially non-rotational relative to the well bore during the drilling operation. Downhole tool 100 may be configured for mounting on a drill string and thus include conventional threaded or other known connectors on the top and bottom thereof, such as drill bit receptacle 125. In other exemplary embodiments downhole tool 100 may include drilling motors, drill bit assemblies, stabilizers, measurement while drilling tools, logging while drilling tools, other steering tools, turbines, alternators, production pumps, under-reamers, hole-openers, turbine-alternators, downhole hammers, and the like.

Although the deployments and embodiments described herein are directed to subterranean applications, it will be appreciated that hydrostatic mechanical seal assemblies according to the present invention are not limited to downhole tools, such as that illustrated on FIG. 1, or even to downhole applications. Rather, embodiments of the invention may be useful in a wide range of applications requiring one or more mechanical seals, such as for example, pumps, compressors, turbines, gear boxes, motorized vehicles, engines, electric power generation equipment, boats, household appliances, agricultural and construction equipment, and the like.

With reference now to FIG. 2, a cross sectional schematic of one exemplary embodiment of a hydrostatic mechanical seal assembly 10 is shown. Seal assembly 10 includes a mating ring 20 having a sealing face 22 and a sealing ring 30 having a sealing face 32. Seal assembly 10 further includes a biasing member 42 (such as a metal bellows, a spring member, or another suitable equivalent), which resiliently preloads (i.e., biases) the face 32 of sealing ring 30 towards the face 22 of mating ring 20. It will be appreciated that while the biasing member 42 is shown biasing the sealing ring 30 towards the mating ring 20 on FIG. 2, the biasing member 42 may be alternatively disposed to bias the mating ring 20 towards the sealing ring 30. Moreover, one or more biasing members 42 may also simultaneously bias faces 22 and 32 towards one another. Seal assembly 10 further includes a pressure generating device 60 (e.g., a pump) deployed locally with the seal assembly 10, as described in more detail below with respect to FIGS. 2 and 3. It will be appreciated that deploying the pressure generating device 60 locally with the seal assembly includes deploying the pressure generating device 60 integrally with, resident on, adjacent to, and in close proximity to one or more members of the hydrostatic mechanical seal assembly.

With continued reference to FIG. 2, in exemplary embodiments of seal assembly 10, mating ring 20 is substantially stationary (i.e., non-rotating) and coupled to (e.g., sealingly engaged with) a mating ring carrier 25, which may, for example, be coupled to a tool housing 110. Mating ring 25 may further include a dynamic seal 27 with the drive shaft 120 (or a shaft sleeve 122). Sealing ring 30 may be coupled to (e.g., sealingly engaged with) a sealing ring carrier 35, for example via biasing member 42, which as described above resiliently preloads the face 32 of sealing ring 30 towards the face 22 of mating ring 20. Sealing ring carrier 35 may be sealingly engaged via a static seal 37, for example, to a drive shaft 120 (or a shaft sleeve 122) that rotates relative to the housing. One or more radial bearings 50 may be utilized to maintain precise alignment between the rotating and non-rotating components. In the exemplary embodiments shown on FIG. 2, the pressure generating device 60 is deployed integrally with ring carrier 35 and is configured to provide pressurized lubricant fluid from, for example, a fluid reservoir 70, to the interface 24 between mating ring 20 and sealing ring 30. In various exemplary embodiments, pressure generating device 60 is configured to utilize the rotational motion of drive shaft 120 to pressurize the lubricating fluid.

The mating ring 20 and sealing ring 30 may be made from substantially any suitable material. For downhole deployments of the invention, it may be advantageous to fabricate the mating ring and/or the sealing ring from ultra-hard materials to combat the hard abrasive solids found in certain drilling fluids. A typical ultra-hard mating ring and/or sealing ring might optimally be made from a material having a Rockwell hardness value, Rc, greater than about 65. Such ultra-hard materials include, for example, tungsten carbide, silicon carbide, boron containing steels (boronized steels), nitrogen containing steels (nitrided steels), high chrome cast iron, diamond, diamond like coatings, cubic boron nitride, ceramics, tool steels, stellites, and the like. It will be appreciated that while ultra-hard materials may be advantageous for certain exemplary embodiments, this invention is not limited to any particular mating ring and/or sealing ring materials. In applications where hard abrasive solids need not be combated, conventional carbon graphite may be used as a material from which to manufacture the mating ring and/or sealing ring.

With continued reference to FIG. 2, and further reference now to FIG. 3, one exemplary embodiment of a pressure generating device 60 is described in further detail. As described above, seal assembly 10 includes a pressure generating device 60 (such as a pump) deployed locally with the seal assembly 10. In various exemplary embodiments, the pressure generating device 60 may be integral with one or more members of the seal assembly. For example, the ring carrier 35 may be fitted with a helical groove pump (also referred to as a screw pump) as shown on FIG. 3. In the embodiment shown, the outer surface 64 of ring carrier 35 is fitted with one or more helical grooves 62 that serve to pump fluid (thereby increasing the pressure) towards 68 sliding interface 24 upon rotation of the drive shaft 120. It will be appreciated that while the embodiment shown on FIG. 3 includes a helical groove pump deployed on the sealing ring carrier 35, the pressure generating device 60 may be deployed substantially anywhere in or about the seal assembly 10. For example, a helical groove pump (e.g., one or more helical grooves such as grooves 62 in sealing ring carrier 35) may likewise be deployed on the inner surface of a housing or mating ring (e.g., mating ring 25) adjacent carrier ring 35, on the outer surface 34 of the sealing ring 30, on the inner surface 28 of the mating ring carrier 25 adjacent the sealing ring 30, or substantially any other suitable location. Likewise, it will further be appreciated that substantially any suitable pressure generating device may be utilized in embodiments of this invention. For example, various alternative embodiments may include piston, vane, gear, positive displacement, electromechanical, and/or centrifugal pumps.

Figure 4:
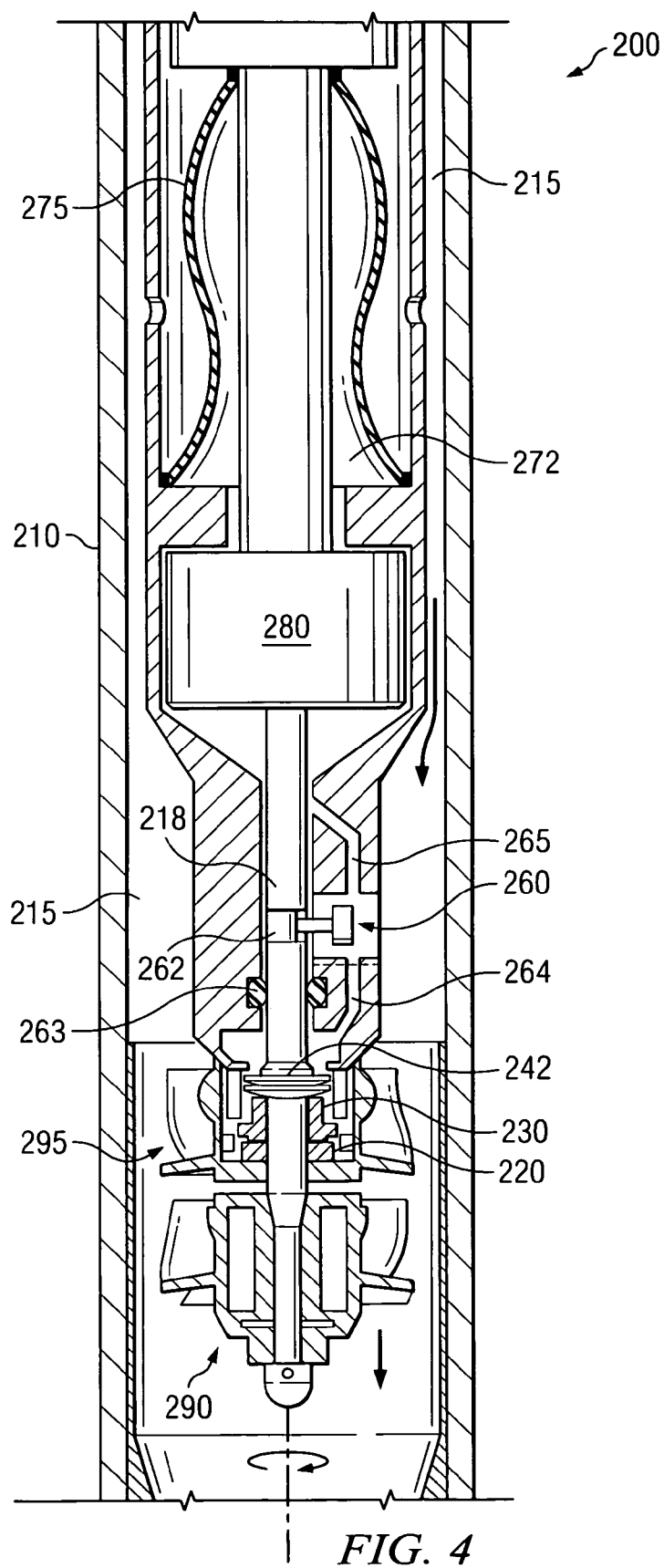
FIG. 4 depicts, in cross section, another exemplary embodiment of a hydrostatic mechanical seal assembly according to this invention.

Turning now to FIG. 4, one alternative embodiment of a sealing assembly according to this invention is shown. Downhole tool 200 includes rotor 290 and stator 295 assemblies of a downhole turbine deployed in a downhole tool body 210 and coupled to a drive shaft 218 and alternator 280. In the embodiment shown, drilling fluid (drilling mud) is pumped down through annular region 215 to power the turbine. The sealing assembly is similar to that described above with respect to FIG. 2 in that it includes mating 220 and sealing 230 rings having adjacent sealing faces. Coil springs 242 are disposed to bias sealing ring 230 towards mating ring 220. In the embodiment shown, mating ring 220 is substantially stationary (i.e., non-rotating), while sealing ring 230 and coil spring 242 are disposed to rotate with the drive shaft 220.

In the exemplary embodiment shown on FIG. 4, a piston pump 260 is deployed substantially adjacent to sealing ring 230. The piston pump 260 is driven by an eccentric diameter cam 262 formed in the drive shaft 220 and is disposed to provide pressurized fluid from a fluid reservoir 272 to the pump 260 through passageway 265 and on to the interface between the mating 220 and sealing 230 rings via passageway 264. The piston pump 260 includes a dynamic seal 263 with the drive shaft 220 to prevent pressure loss in the pressurized fluid (i.e., to separate the high and lower pressure fluid). The tool 200 may optionally include a bladder 275 (e.g., an elastomeric boot) disposed in the fluid reservoir 272 for providing pressure equalization between drilling fluid in annular region 215 and lubricating fluid in the fluid reservoir 272. Use of the bladder 275 advantageously tends to equalize pressure spikes between the drilling fluid and sealed fluid and therefore tends to reduce the likelihood of pressure reversals at the interface between the mating 220 and sealing 230 rings.

As described above, the exemplary embodiments shown on FIGS. 2 and 4 include pumps 60 and 260 deployed locally with the sealing members. In the embodiment shown on FIG. 2, the pump 60 is deployed integrally with the sealing ring carrier 35. In the exemplary embodiment shown on FIG. 4, pump 260 is deployed in close proximity to mating 220 and sealing 230 rings. In this exemplary embodiment, pump 260 is deployed about 6 inches above the mating 220 and sealing 230 rings. Of course, the invention is not limited in these regards. Rather, these exemplary embodiments shown on FIGS. 2 and 4 are intended to illustrate what is meant by "local deployment" of the pumping mechanism. In the exemplary embodiments shown, the pumps 60 and 260 are deployed near enough to the respective sealing interfaces so that there is substantially no pressure loss in the lubricating fluid between the pumps 60 and 260 and the sealing interfaces. This is in contrast to prior art arrangements in which remote deployment of the pump and/or accumulator often results in a pressure loss (drop) in the lubricating fluid between the pump and the sealing interface. Such pressure losses are typically due to both the distance between the pump and the sealing interface and the tortuous fluid flow path therebetween. As described above in the Background Section, such pressure drops and/or spikes are known to result in premature seal failure, especially in downhole tools. In many prior art arrangements the pump and/or accumulator is deployed 2 feet or more above or below the sealing members.

Although the present invention and its advantages have been described in detail, it should be understood that various changes, substitutions and alternations can be made herein without departing from the spirit and scope of the invention as defined by the appended claims.

I claim:

1. A hydrostatic mechanical face seal assembly comprising:
    a mating ring having a first sealing face;
    a sealing ring having a second sealing face, the sealing ring deployed substantially coaxially with the mating ring, the sealing ring further disposed to rotate relative to the mating ring;
    the first and second sealing faces biased towards one another; and a pump disposed to pressurize a lubricating fluid at an interface between the first and second sealing faces, the pump deployed locally with the mating ring and the sealing ring, but not on either of the first and second sealing faces.

2. The hydrostatic mechanical face seal assembly of claim 1, wherein at least one of the mating ring and the sealing ring are fabricated from a material having a Rockwell C hardness value of greater than about 65.

3. The hydrostatic mechanical face seal assembly of claim 1, wherein at least one of the mating ring and the sealing ring are fabricated from a material selected from the group consisting of tungsten carbide, silicon carbide, boron-containing steel, nitrogen-containing steel, tool steel, high chrome cast iron, cubic boron nitride, ceramic, carbon graphite, and diamond.

4. The hydrostatic mechanical face seal assembly of claim 1, wherein the first and second sealing faces are biased towards one another via a member selected from the group consisting of bellows and springs.

5. The hydrostatic mechanical face seal assembly of claim 1, wherein the pump is deployed integrally with the seal assembly.

6. The hydrostatic mechanical face seal assembly of claim 1, wherein the pump is deployed integrally with a member of the group consisting of the sealing ring and the mating ring.

7. The hydrostatic mechanical face seal assembly of claim 1, wherein:
the mating ring is coupled to a mating ring carrier and the sealing ring is coupled to a sealing ring carrier; and
the pump is deployed on a member selected from the group consisting of the sealing ring, the sealing ring carrier, the mating ring, and the mating ring carrier.

8. The hydrostatic mechanical face seal assembly of claim 7, wherein the pump is deployed integrally with a member selected from the group consisting of the sealing ring, the sealing ring carrier, the mating ring, and the mating ring carrier.

9. The hydrostatic mechanical face seal assembly of claim 7, wherein the pump comprises a helical groove pump.

10. The hydrostatic mechanical face seal assembly of claim 1, wherein the pump comprises a member selected from the group consisting of a screw pump, a piston pump, a vane pump, a gear pump, an electromechanical pump, a positive displacement pump, a centrifugal pump, a cam driven piston pump, and a helical groove pump.

11. A hydrostatic mechanical face seal assembly comprising:
a mating ring having first sealing face, the mating ring deployed on a mating ring carrier;
a sealing ring having a second sealing face, the sealing ring deployed on a sealing ring carrier, the sealing ring deployed substantially coaxially with the mating ring, the sealing ring and the sealing ring carrier disposed to rotate relative to the mating ring and the mating ring carrier;
the first and second sealing faces biased towards one another; and
a pump disposed to pressure a lubricating fluid at an interface between the sealing faces, the pump deployed locally with the seal assembly, but not on either of the first and second sealing faces.

12. The hydrostatic mechanical face seal assembly of claim 11, wherein the mating ring is sealingly engaged with the mating ring carrier and the sealing ring is sealingly engaged with the sealing ring carrier.

13. The hydrostatic mechanical face seal assembly of claim 11, wherein the first and second sealing faces are biased towards one another via a spring member selected the group consisting of bellows and springs, the spring member coupled to at least one of the sealing ring, the sealing ring carrier, the mating ring, and the mating ring carrier.

14. The hydrostatic mechanical face seal assembly of claim 11, wherein:
the mating ring carrier is deployed on a tool housing; and
the pump is integral with the tool housing adjacent to one of the sealing ring and the sealing ring carrier.

15. The hydrostatic mechanical face seal assembly of claim 11, wherein the pump comprises a helical groove pump deployed integrally with one of the sealing ring, the sealing ring carrier, the mating ring, and the mating ring carrier.

16. The hydrostatic mechanical face seal assembly of claim 11, wherein the pump comprises a member selected from the group consisting of a screw pump, a piston pump, a vane pump, a gear pump, an electromechanical pump, a positive displacement pump, a centrifugal pump, a cam driven piston pump, and a helical groove pump.

17. The hydrostatic mechanical face seal assembly of claim 11, wherein at least one of the mating ring and the sealing ring are fabricated from a material having a Rockwell C hardness value of greater than about 65.

18. The hydrostatic mechanical face seal assembly of claim 11, wherein at least one of the mating ring and the sealing ring are fabricated from a material selected from the group consisting of tungsten carbide, silicon carbide, boron-containing steel nitrogen-containing steel, tool steel, high chrome cast iron, cubic boron nitride, ceramic, carbon graphite, and diamond.

19. A downhole tool comprising:
a substantially cylindrical downhole tool body having a cylindrical axis; and
a hydrostatic mechanical face seal assembly disposed to seal a drilling fluid, the seal assembly comprising:
a) a mating ring having a first sealing face;
b) a sealing ring having a second sealing face, the sealing ring deployed substantially coaxially with the mating ring, the sealing ring further disposed to rotate about the cylindrical axis relative to the mating ring, the first and second sealing faces biased towards one another; and
c) a pump disposed to pressurize a lubricating fluid at an interface between the first and second sealing faces, the pump deployed locally with the seal assembly, but not on either of the first and second sealing faces.

20. The downhole tool of claim 19, wherein the downhole tool comprises a member selected from the group consisting of a drilling motor, a drill bit assembly, a stabilizer, a measurement while drilling tool, a logging while drilling tool, a steering tool, a turbine, an alternator, a production pump, an under-reamer, a hole-opener, a turbine-alternator, and a downhole hammer.

21. The downhole tool of claim 19, wherein the pump comprises a member selected from the group consisting of a screw pump, a piston pump, a vane pump, a gear pump, an electromechanical pump, a positive displacement pump, a centrifugal pump, a cam driven piston pump, and a helical groove pump.

22. The downhole tool of claim 19, wherein at least one of the mating ring and the sealing ring are fabricated from a material having a Rockwell C hardness value of greater than about 65.

23. The downhole tool of claim 19, wherein at least one of the mating ring and the sealing ring are fabricated from a material selected from the group consisting of tungsten carbide, silicon carbide, boron-containing steel, nitrogen-containing steel, tool steel, high chrome cast iron, cubic boron nitride, ceramic, carbon graphite, and diamond.

24. The downhole tool of claim 19, further comprising a rotatable drive shaft deployed substantially coaxially with the cylindrical axis, the sealing ring being coupled to the drive shaft.

25. The downhole tool of claim 24, wherein the mating ring is coupled to the downhole tool body.

26. The downhole tool of claim 25, wherein:
the mating ring is coupled to a mating ring carrier;
the sealing ring is coupled to a sealing ring carrier; and
the pump comprises a helical groove pump deployed on one of the mating ring, the mating ring carrier, the sealing ring, and the sealing ring carrier.

27. The downhole tool of claim 24, wherein:
the pump includes a cam driven piston pump, and
the drive shaft includes an eccentric diameter cam disposed to drive the earn driven piston pump.

28. The downhole tool of claim 19, wherein the pump is in fluid communication with a fluid filled chamber, the pump disposed to pressurize the lubricating fluid from the fluid filled chamber to the interface between the first and second sealing faces.

29. The downhole tool of claim 28, wherein the fluid filled chamber includes a bladder deployed therein, the bladder deployed between the lubricating fluid and the drilling fluid, the bladder disposed to equalize pressure spikes between the lubricating fluid and the drilling fluid.

30. The downhole tool of claim 29, wherein the bladder comprises an elastomeric material.

31. A tool comprising:
a rotatable drive shaft deployed in a substantially non rotating tool housing;
a hydrostatic mechanical face seal assembly disposed to seal a contaminant fluid, the seal assembly comprising:
  a) mating ring having a first sealing face, the mating ring deployed substantially coaxially about the drive shaft; the mating ring being substantially non rotational relative to the tool housing;
  b) a sealing ring having a second sealing face, the sealing ring deployed substantially coaxially about and coupled with the drive shaft, the sealing ring and the mating ring disposed to rotate relative to one another, the first face and the second face biased towards one another; and
  c) a pump disposed to pressurize a lubricating fluid at an interface between the first and second sealing faces, the pump deployed locally with the seal assembly, but not on either of the first and second sealing faces.

32. The tool of claim 31, wherein:
the mating ring is coupled to a mating ring carrier;
the sealing ring is coupled to a sealing ring carrier; and
the pump comprises a helical groove pump deployed on one of the mating ring, the mating ring carrier, the sealing ring, the sealing ring carrier and the tool housing.

33. The tool of claim 31, wherein:
the pump includes a cam driven piston pump; and
the drive shaft includes an eccentric diameter cam disposed to drive the cam driven piston pump.

34. The tool of claim 31, wherein:
the pump is in fluid communication with a fluid filled chamber, the pump disposed to pressurize the lubricating fluid from the fluid filled chamber to the interface between the first and second sealing faces; and
the fluid filled chamber includes a bladder deployed therein, the bladder deployed between the lubricating fluid and the drilling fluid, the bladder disposed to equalize pressure spikes between the lubricating fluid and the drilling fluid.

* * * * *